(12) United States Patent
Shapiro et al.

(10) Patent No.: US 10,177,573 B2
(45) Date of Patent: Jan. 8, 2019

(54) METHOD AND APPARATUS FOR VOLTAGE CONTROL IN ELECTRIC POWER SYSTEMS

(71) Applicant: Statistics & Control, Inc., West Des Moines, IA (US)

(72) Inventors: Vadim Shapiro, Clive, IA (US); Dmitriy Khots, Omaha, NE (US); Ilya Markevich, West Des Moines, IA (US)

(73) Assignee: Statistics & Control, Inc., West Des Moines, IA (US)

( * ) Notice: Subject to any disclaimer, the term of this patent is extended or adjusted under 35 U.S.C. 154(b) by 238 days.

(21) Appl. No.: 15/267,654

(22) Filed: Sep. 16, 2016

(65) Prior Publication Data

US 2017/0085086 A1 Mar. 23, 2017

Related U.S. Application Data

(60) Provisional application No. 62/220,642, filed on Sep. 18, 2015.

(51) Int. Cl.
*G05D 3/12* (2006.01)
*H02J 3/18* (2006.01)
(Continued)

(52) U.S. Cl.
CPC ............... *H02J 3/18* (2013.01); *G05B 11/36* (2013.01); *H02J 3/16* (2013.01); *H02J 2003/001* (2013.01); *Y02E 40/34* (2013.01)

(58) Field of Classification Search
CPC .......... H02J 3/18; H02J 3/16; H02J 2003/001; G05B 11/36; Y02E 40/34
See application file for complete search history.

(56) References Cited

U.S. PATENT DOCUMENTS

| 6,549,880 B1 * | 4/2003 | Willoughby | H02J 3/00 700/22 |
| 6,614,631 B1 * | 9/2003 | Drake | H02H 7/09 361/23 |

(Continued)

*Primary Examiner* — Adam Lee
(74) *Attorney, Agent, or Firm* — McKee, Voorhees & Sease, PLC

(57) ABSTRACT

A method and apparatus of coordinated voltage control for electric power systems with at least two substations and at least one load, a method of controlling distribution of reactive power between substations within a power system of similar parameters, and a method of reduction of interaction between voltage control modules in the said power system are disclosed. The purpose of coordinated control is to maintain acceptable voltage with minimal deviation from the set point across all elements of the power system. Disclosed coordinated control is accomplished via each substation's transformers equipped with on load tap changers (OLTC) and electrical generators Automatic Voltage Regulators (AVR) using proportional-integral-derivative control embedded in coordinated master controllers. The purpose of controlling the distribution of reactive power is to minimize power losses, maintain each busbar voltage in accordance to selected set point, maintain active and reactive power reserves, and minimizing the reactive power drawn from the transmission system by manipulating transformer's OLTC, generator's AVR, and energizing capacitors and inductors. Control of reactive power flow through the network is accomplished by the following steps:

Sensing and measuring active and reactive power flow rates, and all controlled busbars voltages.
Computing each voltage/reactive power controller set point and controlled variable.
Using PID algorithm to compute each controller output to maintain network voltages and reactive power flows in accordance to defined set points.

(Continued)

Implementing control actions based on computed output values.

Finally, reducing the interaction between various voltage control mechanisms. It is important to ensure smooth system operation. This is accomplished by counteracting potentially destabilizing interactions between high and low level substations and corresponding control modules using specialized set point correction coefficients.

10 Claims, 9 Drawing Sheets

(51) Int. Cl.
*G05B 11/36* (2006.01)
*H02J 3/16* (2006.01)
*H02J 3/00* (2006.01)

(56) References Cited

U.S. PATENT DOCUMENTS

| | | | | |
|---|---|---|---|---|
| 8,275,485 | B2* | 9/2012 | Schweitzer, III | H02J 13/0062 700/286 |
| 2004/0100341 | A1* | 5/2004 | Luetzelschwab | H03F 1/56 333/32 |
| 2004/0239298 | A1* | 12/2004 | Norrga | H02M 7/4826 323/282 |
| 2004/0244470 | A1* | 12/2004 | Vicci | G01Q 10/06 73/104 |
| 2006/0212737 | A1* | 9/2006 | Chandra | H02J 9/062 713/340 |
| 2006/0259255 | A1* | 11/2006 | Anderson | H04L 12/66 702/64 |
| 2007/0067625 | A1* | 3/2007 | Jiang | H04L 63/10 713/168 |
| 2011/0157942 | A1* | 6/2011 | Babcock | H02M 1/425 363/126 |
| 2012/0134061 | A1* | 5/2012 | Kasztenny | H02H 1/0061 361/64 |
| 2013/0099574 | A1* | 4/2013 | Bourgeois | H02J 9/062 307/66 |
| 2013/0131878 | A1* | 5/2013 | Wilkins | G06F 1/26 700/287 |
| 2013/0187464 | A1* | 7/2013 | Smith | H02S 30/20 307/47 |
| 2013/0307494 | A1* | 11/2013 | Meinecke | H02J 3/1878 323/205 |
| 2015/0155712 | A1* | 6/2015 | Mondal | H02J 3/1857 307/23 |
| 2015/0180355 | A1* | 6/2015 | Freeman | H02M 1/08 363/21.04 |
| 2015/0364919 | A1* | 12/2015 | Schumer | H02J 3/14 700/291 |
| 2016/0118878 | A1* | 4/2016 | Alteneiji | H02J 3/1821 323/205 |
| 2016/0224045 | A1* | 8/2016 | Wong | G05F 1/66 |

\* cited by examiner

METHOD AND APPARATUS FOR VOLTAGE CONTROL IN ELECTRIC POWER SYSTEMS

CROSS-REFERENCE TO RELATED APPLICATIONS

This application claims priority under 35 U.S.C. § 119 to provisional application Ser. No. 62/220,642, filed Sep. 18, 2015, herein incorporated by reference in its entirety.

BACKGROUND OF THE INVENTION

An electric power system also known as an electrical grid, or just grid, is a network of interconnected components that typically involve a generation element (such as a nuclear power plant, a hydro-electric plant, or a smaller plant powered by gas fueled turbo generators), a transmission system (high voltage lines), a distribution system (lower voltage lines), and a set of customers or loads (lowest voltage levels). The connection between elements of the grid is accomplished through a set of step-up transformers (e.g., increasing voltage from a generating station to the transmission line) and step-down transformers (e.g., decreasing voltage from transmission lines into the distribution system via a substation equipped with such transformers). A healthy operation of the entire grid depends on healthy operation of each element of the grid. This is important from a cost perspective as well as safety perspective, which in turn makes optimal operation of the grid an important aspect even for policy makers, which is exemplified by Stan M. Kaplan's report to Congress, "Electric Power Transmission: Background and Policy Issues", CRS Report for Congress, 2009.

The health of the grid and its components is typically ensured by automatic generation control (AGC), which is a system for adjusting power output across multiple generators at different power plants and substations, especially in response to changes in consumption, or load. Since inception of electricity and power generation, this control was accomplished with fixing a single generating unit as a reference for regulation and having the remaining generating units be controlled using the so-called "speed droop". According to Woodward Corp, "Speed Droop and Power Generation", Woodward Application Note 01302, 1991, speed droop is a governor (or prime mover driving a synchronous generator) function which reduces the governor reference speed as fuel position (load) increases and vice versa. With modernization of power generation control, multiple generation units are enabled in regulation, which reduces wear and tear of each individual unit's control mechanisms and improves overall system operation and performance.

The disclosed invention is in the general field of automatic generation control, which is accomplished through two primary methods. The first method is the Active Power (P) and Frequency (F) control, while the second method is Reactive Power (Q) and Voltage (V) control. When connected to the grid, the frequency of a power plant network is fixed by the grid. The P/F control in this case is P control only. The purpose of P control is threefold:
1. To ensure optimal sharing of the load among the generators.
2. To maintain the exchange of active power with grid in accordance to a defined set point.
3. To ensure adequate reserve capacity to maintain system stability in the event of an incident.

In cases where any sub-network operates in an island mode, the frequency of the sub-network is determined by the generators connected to the islanded part of the power plant network. In these cases the purpose of control is as follows.
1. To control frequency at pre-defined set point by producing power set points (in MW) to all operating generators.
2. To ensure optimal sharing of load among generators.
3. To ensure adequate reserve capacity to maintain system stability in the event of an incident.

Strictly speaking, Active Power and Frequency control is not part of the disclosed invention as a claim, however, it interacts with the claimed invention of Reactive Power and Voltage Control functionality and its overview is provided henceforth for completeness purposes only. Active (Real) Power and Frequency control is known in the art with a good background provided by Chien-Ning Yu, "Real Power and Frequency Control of Large Electric Power Systems under Open Access," Master's Thesis, MIT, 1996.

It is imperative to have proper Active Power and Frequency controls in place in order to achieve optimal operation and avoid system collapse. It is known that frequency within a power grid is constant when the same amount of electrical power is produced as consumed by the loads, including system losses. This is the optimal system state, however, if this is not the case frequency changes will occur. For example, the frequency of the system is reduced when a load increase is not compensated for by a corresponding increase of the turbine power of the connected generators. The power deficit will then decelerate the generator rotors and consequently reduce the frequency. Frequency reductions may also arise when production is lost, e.g., as a consequence of failures in the system where various safety response mechanisms disconnect the failed equipment from the grid. Significant reductions in frequency could lead to system collapse, due to the fact that most power station equipment, e.g. power supply systems, does not tolerate abnormally low frequencies. On the other hand, a load reduction in the system which is not compensated for by a reduction of turbine power leads to frequency increases, which could also destabilize the entire system.

The reactive mechanism similar to P/F control is Q/V control. Precise voltage control is required to ensure correct operating conditions for generators and loads. Voltage control is directly related to production and distribution of reactive power. Reactive power is the power used to support the transfer of real or active power over transmission and distribution networks in alternating current (AC) power systems, which are the majority of systems in modern power generation. In other words, reactive power is a large part of the cost associated with power generation and is a metric of a grid's efficiency to provide power to customers. The reactive power output of generator is controlled by means of machine excitation. Also, since transformers do not produce or consume any reactive power (they actually absorb reactive power), the Q/V control algorithm has to operate on both generators and transformers. As described in Larsson U.S. Pat. No. 7,956,596 B2, transformer voltage control is accomplished by changing transformer tap positions, which changes the flow of reactive power through the transformer. The purpose of Q/V control is as follows.
1. Voltage control of selected busbars.
2. To ensure proportional sharing of reactive power among generators and transformers.
3. To limit the exchange of reactive power with the grid within a pre-defined range.

It is important that the voltage deviations in the system are limited. This is of importance for the connected loads, but a "good" voltage profile is also essential for keeping the losses low and for utilizing the reactive reserves to establish a secure operation of the system. Voltage control is, as been pointed out earlier, a more local control than the frequency control. Uniqueness and novelty of the disclosed invention is in the methodology used to accomplish coordinated voltage control, while controlling the distribution of reactive power between substations and reducing of interaction between voltage control modules.

SUMMARY OF THE INVENTION

A method of coordinated voltage control for electric power systems is disclosed that focuses on control of distribution of reactive power between substations while minimizing the interaction between voltage control modules. The method is applicable to power systems with at least two substations and at least one load. The said control is accomplished by utilizing available control elements including transformers equipped with On Load Tap Changers and turbo generators equipped with Automatic Voltage Regulators. The said control is accomplished via the following steps. First, the algorithm assesses operating mode of each Voltage Control Module across both High Level and Low Level voltage substations. Second, the Master Voltage Controller uses a Proportional-Integral-Derivative control algorithm to regulate voltage across all turbo generators within the High Level voltages buses, where the primary process variable is the average of all high level bus voltages and secondary process variable is output by the reactive power exchange PID algorithms and the overall control action is the sum of primary and secondary control outputs. Third, the algorithm counteracts potentially destabilizing interactions between High and Low Level control modules by adjusting the Low Level set point using a correction coefficient (so called E ratio). Fourth, the system controls all the low level substations by incorporating the said correction coefficient using a set of PID control loops. Fifth, the system maintains predetermined relationships across all generators connected to each low level substation by matching functions of reactive power load rate using a flow rate balancing parameter, which is a scaling factor. Sixth, the system allows for the controller to make "course" adjustments using OLTC control mechanism to limit the exchange of reactive power with the power grid within operator specified dead band. And finally, seventh, the Voltage Control module calculates its response from the deviation of its voltage variable to manipulate the set points of the on load tap changers (OLTC) of the transformers which connect High Level Substation and Low Level Substation (or load) in a way that minimizes interaction between high voltage buses.

DETAILED DESCRIPTION OF THE PREFERRED EMBODIMENT

Figure 1:
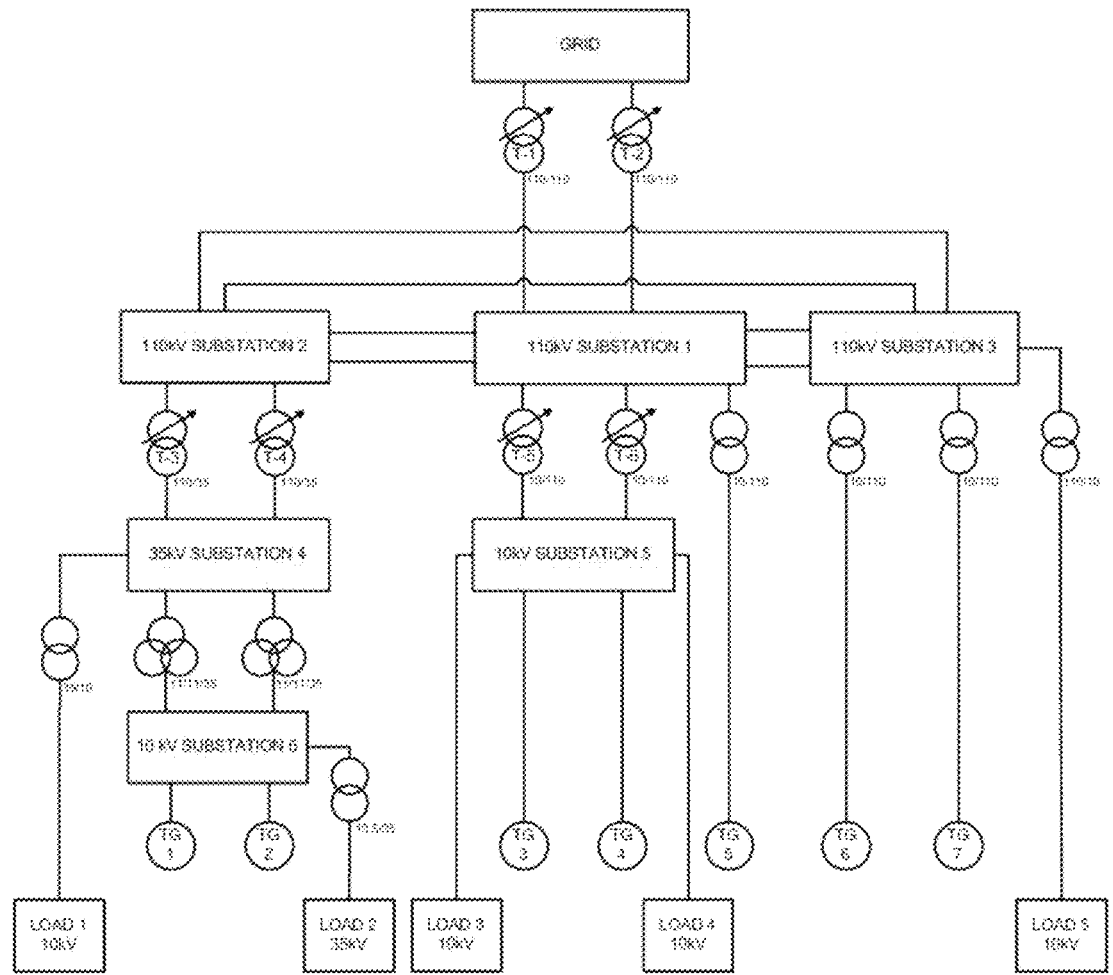
FIG. 1 shows a simplified example of a power distribution system.

Details of the disclosed invention are illustrated on a specific example of a simplified power distribution system shown in FIG. 1, however, results and value of the invention is generalizable to any power distribution system with at least two substations and at least one load. The system shown in FIG. 1 has five sources of electrical power:

1. Two transformers (T-1 and T-2) connecting the 110 kV switchyard to the grid.
2. Two turbo generators (TG1 and TG2) in substation 6 connected at 11 kV.
3. Two turbo generators (TG3 and TG4) in substation 5 connected at 10 kV.
4. One turbo generator (TG5) in substation 1 connected at 110 kV.
5. Two turbo generators (TG6 and TG7) in substation 3 connected at 110 kV.

The main system transformers (T-1 through T-6) are used in voltage control operations and are equipped with On Load Tap Changers (OLTC). Each transformer's index indicates the to/from voltage transformation. For example, transformer T-3 index is 110/35, which means that T-3 transforms 110 kV of potential available in Substation 2 into 35 kV of potential in Substation 4. Also, transformer T-5 index is 10/110. Since Substation 5 is powered by turbo generators TG3 and TG4, which usually operate at 10 kV, T-5 steps-up 10 kV from Substation 5 into 110 kV in Substation 1. The diagonal arrow through the double circle transformer index indicates presence of an OLTC, while three circle symbol indicates a three winding potential transformer.

All gas turbine driven generators are equipped with voltage regulatory control systems. The network supplies five main loads (LOAD 1 through LOAD 5) of varying voltage. For example, LOAD 2 is connected to Substation 6 with a step-up transformer taking 10.5 kV into 35 kV.

The disclosed invention is embedded into the overall Power Control System (PCS) which controls generators and transformers in the various subsystems in order to achieve voltage control, reactive power control, active power control, and frequency control of the system. PCS produces set points for all generators and also controls the set points of the transformers' OLTC's.

Figure 2:
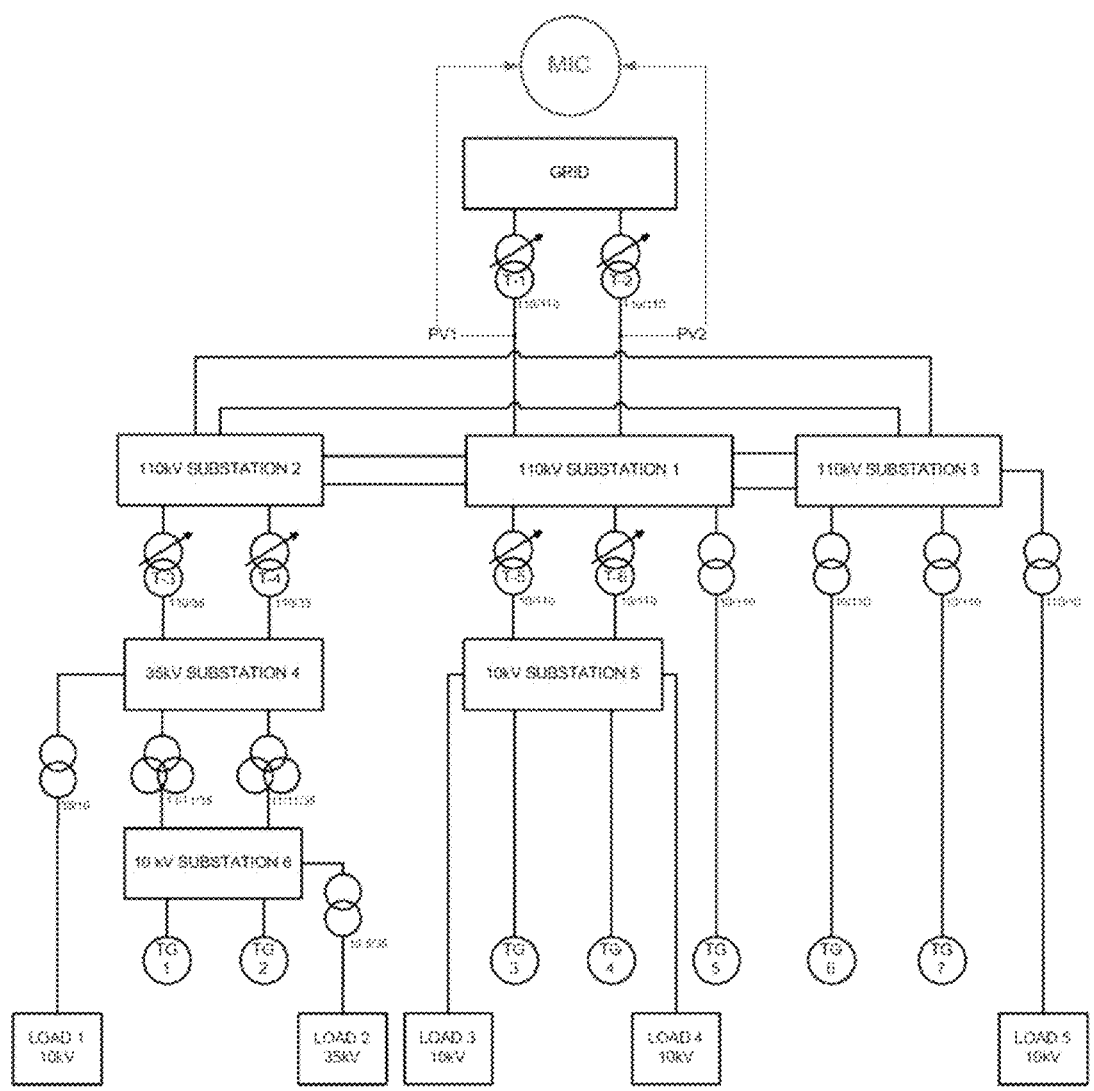
FIG. 2 shows Active Power and Frequency control architecture.

One of the primary control functions of PCS is Active Power and Frequency Control. This is well known in the art and is provided in this document for reference and completeness purposes only due to the fact that P/F control interacts with the disclosed Voltage Control algorithms. FIG. 2 shows the high level Active Power and Frequency Control module architecture deployed within the power system provided in FIG. 1. FIG. 2 shows that the Active Power and Frequency Control algorithm (Master Indicating Controller or MIC) utilizes two proportional-integral-derivative (PID) control loops. MIC's first PID control loop is the active power flow from and to the grid, indicated by PV1, and the second PID control loop is the power load sharing control loop, indicated by PV2.

The primary control variable PV1 in MIC loop is the active power flow to/from grid. Its set point is denoted by SP1 and it is operator adjustable. MIC final control elements are the gas turbines' TG1-TG7 fuel controllers, which accept power (MW) set points from MIC. The secondary power load sharing control loop's purpose is to distribute the total load by equalizing appropriate variables. The primary control variables of Load Sharing Control Applications are MW load of each turbo generator. The set points for the load sharing control application is the average MW load of all generators operating in droop control mode.

The fundamental idea of droop control is that since all synchronous generators frequencies are set by the grid, each generator must run at the same speed. Let $f_{TGi}$, $p_{TGi}$, and $N_{TGi}$ be the frequency (in Hz), number of poles, and speed (in RPM) respectively of generator TGi, for i=1, ..., 7. Then the following relationship holds:

$$f_{TGi} = \alpha \cdot p_{TGi} \cdot N_{TGi} \tag{1}$$

where $\alpha$ is a constant. Therefore, frequency is directly proportional to speed. Next, depending on the rating (aka no load speed) of each generator's turbine $R_{TGi}$ and its full load speed $F_{TGi}$, the droop percent is calculated according to equation (2).

$$\text{Droop } \% = \frac{R_{TGi} - F_{TGi}}{R_{TGi}} \tag{2}$$

Thus, droop can be thought of as a percentage change in rating (or design) speed required for 100% governor action. Since the frequency is fixed by the grid, so is each generator's speed, thus an increase in turbine speed reference increases $R_{TGi}$-$F_{TGi}$, which then drives the controller to increase fuel flow to increase power output. Thus, final control elements for load sharing control are the same as with active power flow control, which are gas turbines TG1-TG7 fuel controllers. The end result is that each turbo generator shares load which is proportional to its rating.

Let $CVP_{TGi}$ denote the fuel controller action issued by MIC PV1 loop (active power) and let $CVL_{TGi}$ denote the fuel controller action issued by MIC PV2 loop (load sharing). The final output from MIC is then given by equation (3).

$$MIC = \sum_{i=1}^{7}(CVP_{TGi} + CVL_{TGi}) \tag{3}$$

Figure 3:
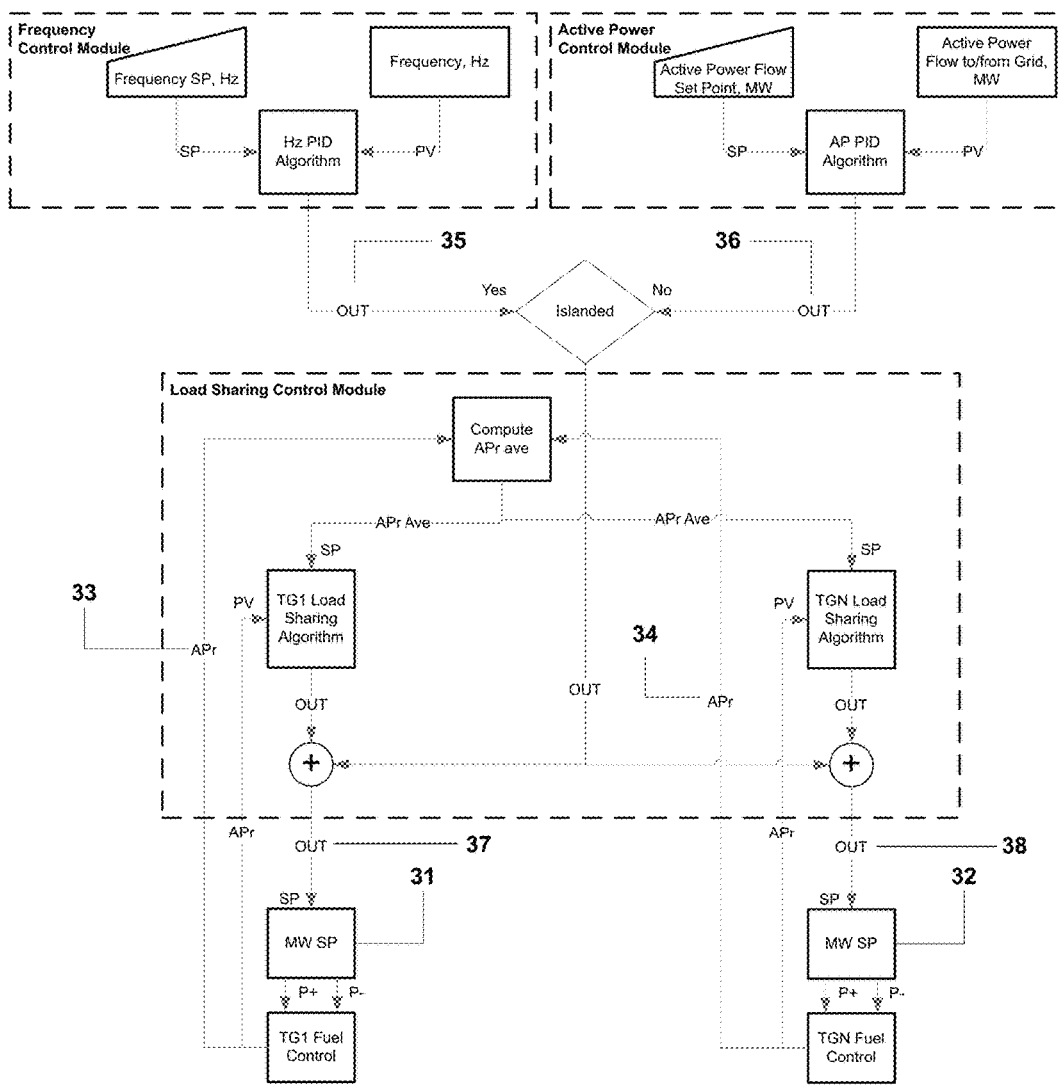
FIG. 3 shows relationships between Active Power control modules.

In situations when the local power distribution network is isolated from the grid, frequency controls are enabled. The MIC control application uses an alternative control variable measuring network frequency. The frequency set points are operator adjustable and final control elements are still the gas turbines TG1-TG7 fuel controllers. Further detail on the relationship between active power control modules is provided in FIG. 3.

Configuration decision within the MIC control application is active power vs frequency control, which depends on whether the network is connected to the grid (active power control) or is islanded (frequency control). If grid is connected, the active power flow between grid and power network is controlled by Active Power Control Module. The main objective of control then is to maintain active power flow by producing megawatt set points (MW SP) 31 and 32 to turbo generators TG1-TGN power controllers. The system uses PID computation algorithm to calculate each MW SP, where PID control itself is well known in the art, see for example, U.S. Pat. No. 8,907,643 B2 by Sreenivas et al. The Active Power Control Module interacts closely with the Load Sharing Control Module which keeps all operating generators within predefined range in accordance with the generator manufacturer and dispatcher recommendations.

If the network is islanded (i.e., if the grid is not connected), then the measured frequency is maintained by Frequency Control Module. Similar to active power control, a PID algorithm is used by the Frequency Control Module to produce MW SP's 31 and 32 for all turbo generators TG1-TGN, where N=7 in case of a power system shown in FIG. 1.

Regardless of connection to the grid, both active power and frequency control modules interact with the Load Sharing Module. The module input is either frequency control output 35 or active power control output 36, and measured active power from turbo generators 33 and 34. The module processes measured active power received from TGs to calculate the average load sharing set point according to equation (4).

$$APr_{ave} = \frac{\sum_{i=1}^{N} APr_{TGi}}{N} \tag{4}$$

Next, the load sharing module analyzes the operating conditions of each unit and calculates the adjustments (if any) to be made to the main stream control output 37 and 38. It then sends the output adjustments to the MW set points for implementation.

The described design has the effect of maintaining headroom between actual and maximum turbine output for frequency response reserve as a result of its load sharing action. The load sharing function is designed to put all turbine-generators at the same per unit load with respect to their present-day maximum capacities. In addition, the MW control limits of each unit are settable by the control-room operator. This allows the operator to ensure the availability of frequency responsive reserve on each unit by setting the high control limit of the Load Sharing Module at a suitable value below what the operator knows to be the maximum capability in a given day.

Figure 4:
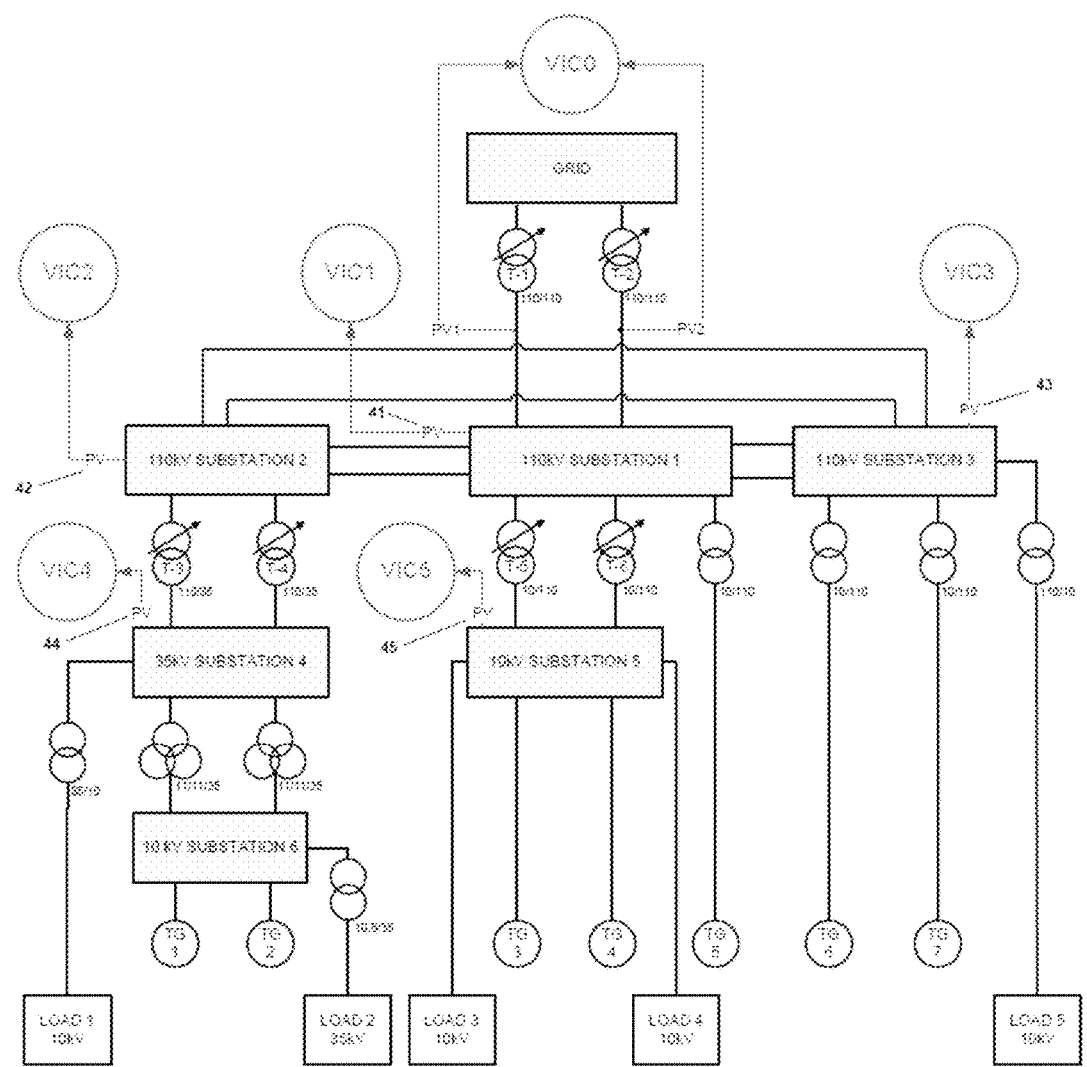
FIG. 4 shows Reactive Power and Voltage Control architecture.

The rest of the discussion centers on the key aspect of the disclosed invention, which is the Reactive Power and Voltage Control. FIG. 4 shows the reactive power and voltage control architecture specific to the power system displayed in FIG. 1. There are seven Voltage Indicating Controller (VIC) control loops involved in efficient operation of the said power system. First is the VIC0 Reactive Power Master Control loop. The primary control variable of the VIC0 controller is reactive power flow to and from the grid, PV1 and PV2. Let $\delta_{VIC0}$ be a predefined target variance for the VIC0 set point, which is operator adjustable, call the set point SP0. Then SP0 is allowed to vary in the following interval [SP0–$\delta_{VIC0}$, SP0+$\delta_{VIC0}$]. VIC0 final control elements are the on load tap changers (OLTC) of T-1 and T-2 transformers.

The second control loop is VIC1 which controls the reactive power and voltage for the 110 kV Substation 1. The primary control variable of the VIC1 controller is the 110 kV Substation 1 bus voltage, 41. Let $\delta_{VIC1}$ be a predefined target variance for the VIC1 set point, which is operator adjustable or adjustable by Coordinated Master Controller, call the set point SP1. Then SP1 is allowed to vary in the following interval [SP1–$\delta_{VIC1}$, SP1+$\delta_{VIC1}$]. VIC1 final control elements are the Automatic Voltage Regulator (AVR) of TG5 as well as the OLTC's of T-5 and T-6 transformers.

The third control loop is VIC2 which controls the reactive power and voltage for the 110 kV Substation 2. The primary control variable of the VIC2 controller is the 110 kV Substation 2 bus voltage, 42. Let $\delta_{VIC2}$ be a predefined target variance for the VIC2 set point, which is operator adjustable or adjustable by Coordinated Master Controller, call the set point SP2. Then SP2 is allowed to vary in the following interval [SP2−$\delta_{VIC2}$, SP2+$\delta_{VIC2}$]. VIC2 final control elements are the OLTC's of T-3 and T-4 transformers.

The fourth control loop is VIC3 which controls the reactive power and voltage for the 110 kV Substation 3. The primary control variable of the VIC3 controller is the 110 kV Substation 3 bus voltage, 43. Let $\delta_{VIC3}$ be a predefined target variance for the VIC3 set point, which is operator adjustable or adjustable by Coordinated Master Controller, call the set point SP3. Then SP3 is allowed to vary in the following interval [SP3−$\delta_{VIC3}$, SP3+$\delta_{VIC3}$]. VIC3 final control element is the AVR of TG-6 and the AVR of TG-7.

The fifth control loop is VIC4 which controls the reactive power and voltage for the 35 kV Substation 4. The primary control variable of the VIC4 controller is the 35 kV Substation 4 bus voltage, 44. Let $\delta_{VIC4}$ be a predefined target variance for the VIC4 set point, which is operator adjustable or adjustable by Coordinated Master Controller, call the set point SP4. Then SP4 is allowed to vary in the following interval [SP4−$\delta_{VIC4}$, SP4+$\delta_{VIC4}$]. VIC4 final control element is the AVR of TG-1 and the AVR of TG-2.

The sixth control loop is VIC5 which controls the reactive power and voltage for the 10 kV Substation 5. The primary control variable of the VIC5 controller is the 10 kV Substation 5 bus voltage, 45. Let $\delta_{VIC5}$ be a predefined target variance for the VIC5 set point, which is operator adjustable or adjustable by Coordinated Master Controller, call the set point SP5. Then SP5 is allowed to vary in the following interval [SP5−SP5+$\delta_{VIC5}$]. VIC5 final control element is the AVR of TG-3 and the AVR of TG-4.

The seventh and last control loop is the VIC0 Load Sharing Control loop which distributes the total reactive load by equalizing appropriate variables. The primary control variables of the Reactive Power Load Sharing Control Application are the reactive power measures (MVAR) of each generator. Let $Qr_{Tgi}$ denote the rated reactive power of each turbo generator operating in droop control mode in a given power system. Then the reactive power load sharing control application set point is given by equation (5).

$$Qr_{ave} = \frac{\sum_{i=1}^{7} Qr_{TGi}}{7} \quad (5)$$

VIC0 load sharing application final control elements are similar to those of VIC1-VIC5, which are turbo generator AVR's and transformer OLTC's across the entire power system. Let $CVQ_j$ denote the fuel controller action issued by Reactive Power Load Sharing Control Application and let $CVV_j$ denote the Master Controller loop/Voltage Control loops controller actions, where j spans the variety of AVR and OLTC actions. The final output from the VIC controller is then given by equation (6).

$$VIC = CVQ_j + CVV_j \quad (6)$$

The overall voltage control architecture can be thought of consisting of three distinct layers of control:
1. MVAR Export/Import Coordinated Control Layer.
2. Master Voltage Control Layer.
3. Bus Voltage Control Layer.

Figure 5:
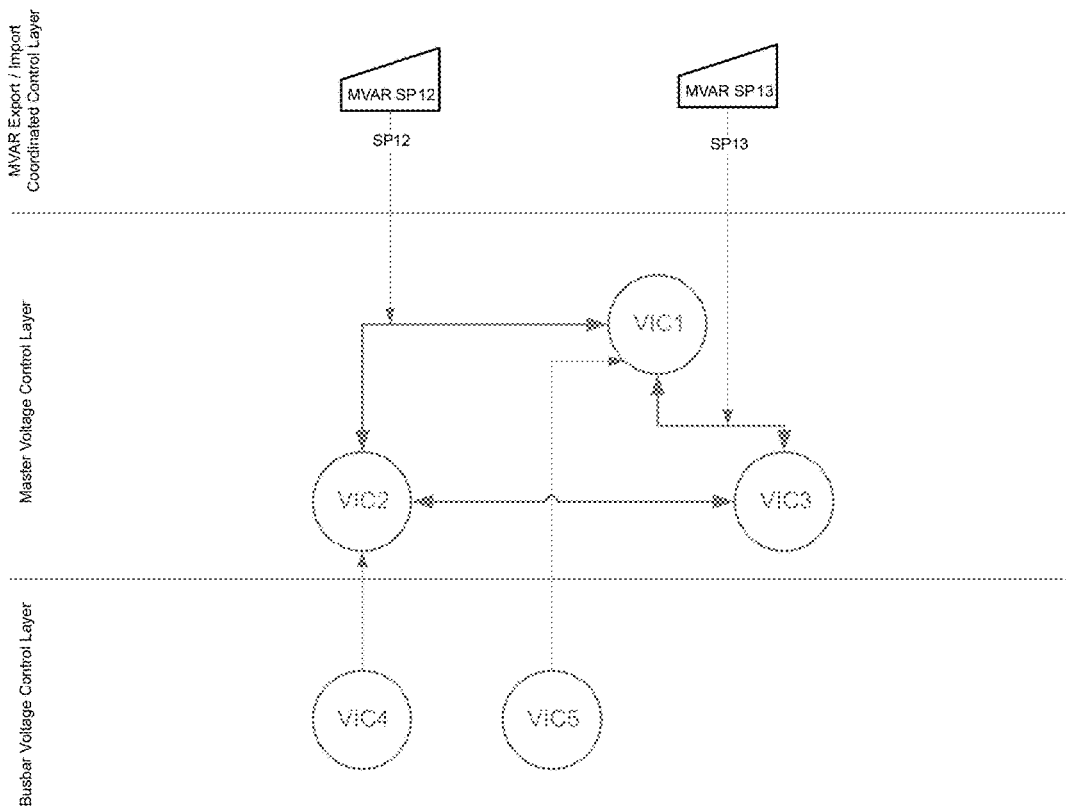
FIG. 5 shows voltage control architecture for the simplified power distribution system example provided in FIG. 1.

FIG. 5 shows the architecture specific to the power system illustrated by FIG. 1. Starting at the top of the control strategy is the total facility MVAR exchange control, which is responsible for the Export/Import of reactive power between all of the substations, in particular, between Substation 1 and Substation 2 (indicated by MVAR SP12) and between Substation 1 and Substation 3 (indicated by MVAR SP13). The middle layer is the coordinated voltage control across high level Voltage Controllers 1, 2, and 3 orchestrated by the Master Voltage Controller. The final tier is the busbar voltage control (low level voltage control) which consists of Voltage Controllers 4 and 5.

Figure 6:
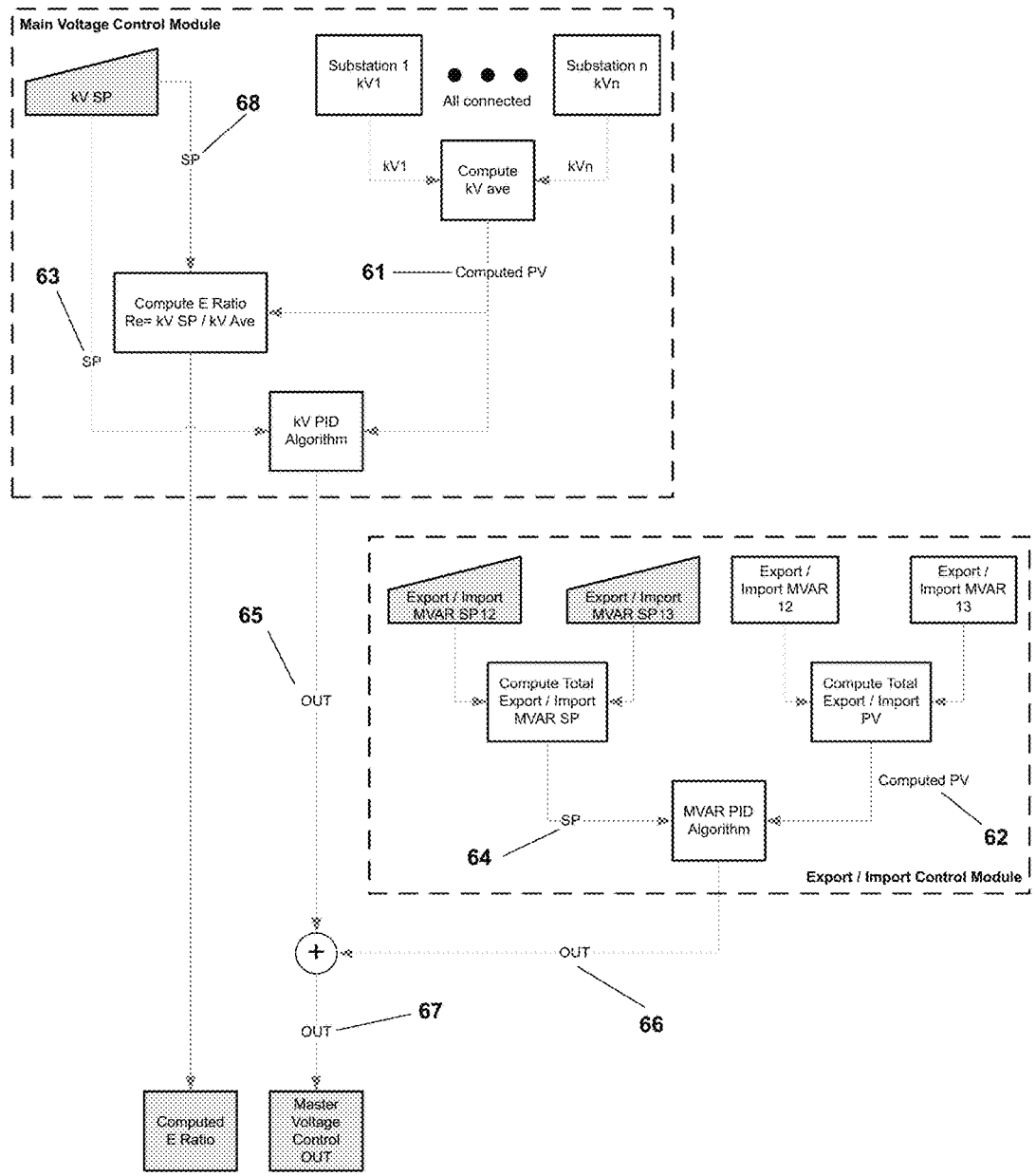
FIG. 6 shows High Voltage Control strategy.

The disclosed invention utilizes different strategies to regulate voltage for High Voltage and Low Voltage substations. The strategy of High Level Substation voltage control is introduced in FIG. 6. There are two main components within high level substation voltage control. First component is the Main Voltage Control Module. The key objective of the Main Voltage Control Module is to maintain average voltage of all High Level Substations by producing set points to the corresponding turbo generators' AVR's followed by utilization of the PID control algorithm. Second component is the reactive power controller exemplified by the MVAR Export/Import Control Module. Primary purpose of the Export/Import control module is to distribute the total load by equalizing appropriate variables. The primary control variable of Export/Import Control Module is average MVAR of all export/import distribution lines. Export/Import Control Module set point is average operator adjustable set points of all export/import distribution lines. The Master Voltage Control output is the sum of the Main Voltage Control Module and Export/Import Control Module outputs. Finally, High Voltage Substation control is achieved by summarizing output from Main Voltage Control Module and the Export/Import Control Module.

Referring now to the power system shown in FIG. 1, there are three high voltage substations—substation 1, substation 2, and substation 3, all with 110 kV. The control algorithm proceeds with the following steps. First, let $kV_i$ be each substation's bus voltage control, for 1=1, 2, 3. Second, the Main Voltage Control Module's kV PID algorithm calculates the process variable 61 according to equation (7).

$$PV_{kV} = \frac{\sum_{i=1}^{3} kV_i}{3} \quad (7)$$

Third, the kV PID algorithm uses kV set point 63 in conjunction with the computed $PV_{kV}$ to generate the module output 65.

The next series of steps is the invocation of the MVAR Export/Import Control Module, which distributes the total load by equalizing appropriate variables. In particular, fourth step involves calculation of the total Export/Import process variable 62. Let $MVAR_{12}$ be the Export/Import MVAR value between Substation 1 and Substation 2. Let $MVAR_{13}$ be the Export/Import MVAR value between Substation 1 and Substation 3. Then let $PV_{MVAR}$ be the primary control variable of the Export/Import Control Module, which is calculated as the average MVAR of all export/import distribution lines. In case of the power system displayed in FIG. 1, the PV calculation can be expressed by equation (8).

$$PV_{MVAR} = \frac{MVAR_{12} + MVAR_{13}}{2} \quad (8)$$

Each export/import distribution line has an operator adjustable set point. Let MVAR_SP$_{12}$ be the operator adjustable set point value of reactive power export/import between Substation 1 and Substation 2. Let MVAR_SP$_{13}$ be the operator adjustable set point value of reactive power export/import between Substation 1 and Substation 3. Fifth step is then for the Export/Import Control Module to calculate the overall export/import set point 64 according to equation (9)

$$PV\_SP_{MVAR} = \frac{MVAR\_SP_{12} + MVAR\_SP_{13}}{2} \qquad (9)$$

The sixth step of the algorithm summarizes the output generated by step three (voltage control output 65) and step five (export/import control module output 66). Total output is the Master Voltage Control Output 67.

The seventh and final step of the algorithm is to counteract potentially destabilizing interactions between High and Low Level Control Modules by calculating a set point correction coefficient for the Low Level PID Voltage Controller. The kV set point 68 is combined with the computed PV 61 according to equation (10).

$$R_e = \frac{kV\_SP}{PV_{kV}} \qquad (10)$$

The correction coefficient is called the E ratio and is calculated as a ratio of Primary Process Control Variable and Primary Voltage Set Point. Finally, the algorithm sends the said set point correction coefficient to each Low Level Voltage Control Modules described in the next section of the disclosed invention.

Figure 7:
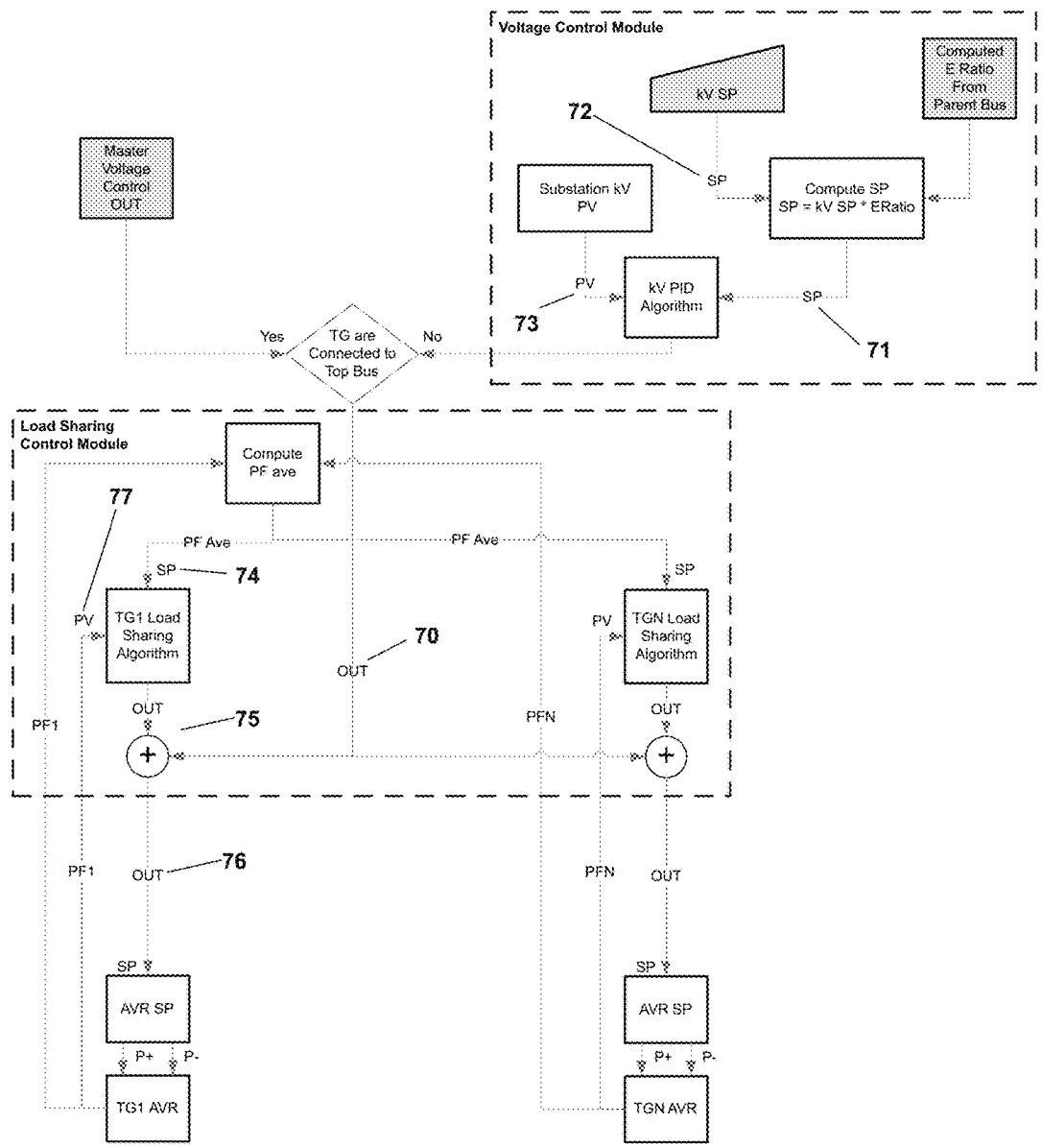
FIG. 7 shows Substation bus (low level) voltage control.

Low Level Substation voltage control uses the High Level Substation voltage control as input and its overall strategy is shown in FIG. 7. There are three main components within low level substation voltage control, which are the High Level Control Output (either Master Voltage Control Output, in case when low level substation turbo generators are connected to the top bus or the computed E Ratio, in case when the turbo generators are not connected to the top bus), Substation Voltage Control Module, and the Load Sharing Control Module.

The main objective of Voltage Control Module is to maintain voltage by producing set point 70 to the turbo generators' AVR's. The voltage control module algorithm has three inputs: substation measured voltage 73, operator adjustable set point 72, and the E Ratio $R_e$ calculated by the High Level Control module. The control module uses a PID algorithm to calculate turbo generator's AVR set points 70. The set point 71 being fed into the PID algorithm is calculated by equation (11).

$$SP = kV\ SP \cdot R_e \qquad (11)$$

The PID algorithm is then executed using PV 73 and SP 71. Referring now to the power system shown in FIG. 1, consider the following two low voltage substations: 35 kV Substation 4 and 10 kV Substation 5. Substation 4 voltage is maintained by AVR's of TG1 and TG2, whereas Substation 5 voltage is maintained by AVR's of TG3 and TG4. In situations, where turbo generators are connected to the Master Voltage Control Layer the low level substation control output is obtained as Master Voltage Control OUT. In the example provided by FIG. 1, there are two such substations: 110 kV Substation 1 and 110 kV Substation 3.

In this case, Substation 1 voltage is maintained by the AVR of TG5 and Substation 3 voltage is maintained by the AVR's of TG6 and TG7. Let the final voltage control output 70 be M_OUT.

In such multi-unit generator settings, the disclosed invention provides a load sharing function which allows balancing of the reactive power output among all the generators. Let $PV_{lsi}$ denote the load rate (or load sharing process variable 77) of each generator with i=1, ..., N. Then the load rate is computed according to equation (12).

$$PV_{lsi} = \frac{MVAR_i - MVAR_{i\ min}}{MVAR_{i\ max} - MVAR_{i\ min}} \qquad (12)$$

Each turbo generator's load sharing algorithm step then compares $PV_{lsi}$ with the average load rate (or Load Sharing Set Point 74), where SP 74 is given by equation (13).

$$SP_{ave} = \frac{\sum_{i=1}^{N} PV_{lsi}}{N} \qquad (13)$$

If each unit Load Sharing Process Variable is different from Load Sharing Set Point, a correction is carried out on each generator according to equation (14).

$$OUT_{lsi} = \begin{cases} OUT_{lsi(n-1)} - \Delta_i \mid PV_{lsi} > SP_{ave} \\ OUT_{lsi(n-1)} + \Delta_i \mid PV_{lsi} < SP_{ave} \end{cases} \qquad (14)$$

Where $OUT_{lsi}$ is the load sharing loop current scan output 75, $OUT_{lsi(n-1)}$ is the load sharing loop previous scan output and $\Delta_i$ is a parametrically defined load sharing ramp. Finally, the main TG set point 76 for each turbo generator is provided by equation (15).

$$OUT_i = OUT_{lsi} + M\_OUT \qquad (15)$$

Thus each turbo generator control is the additive action of the main voltage control and load sharing control.

Figure 8:
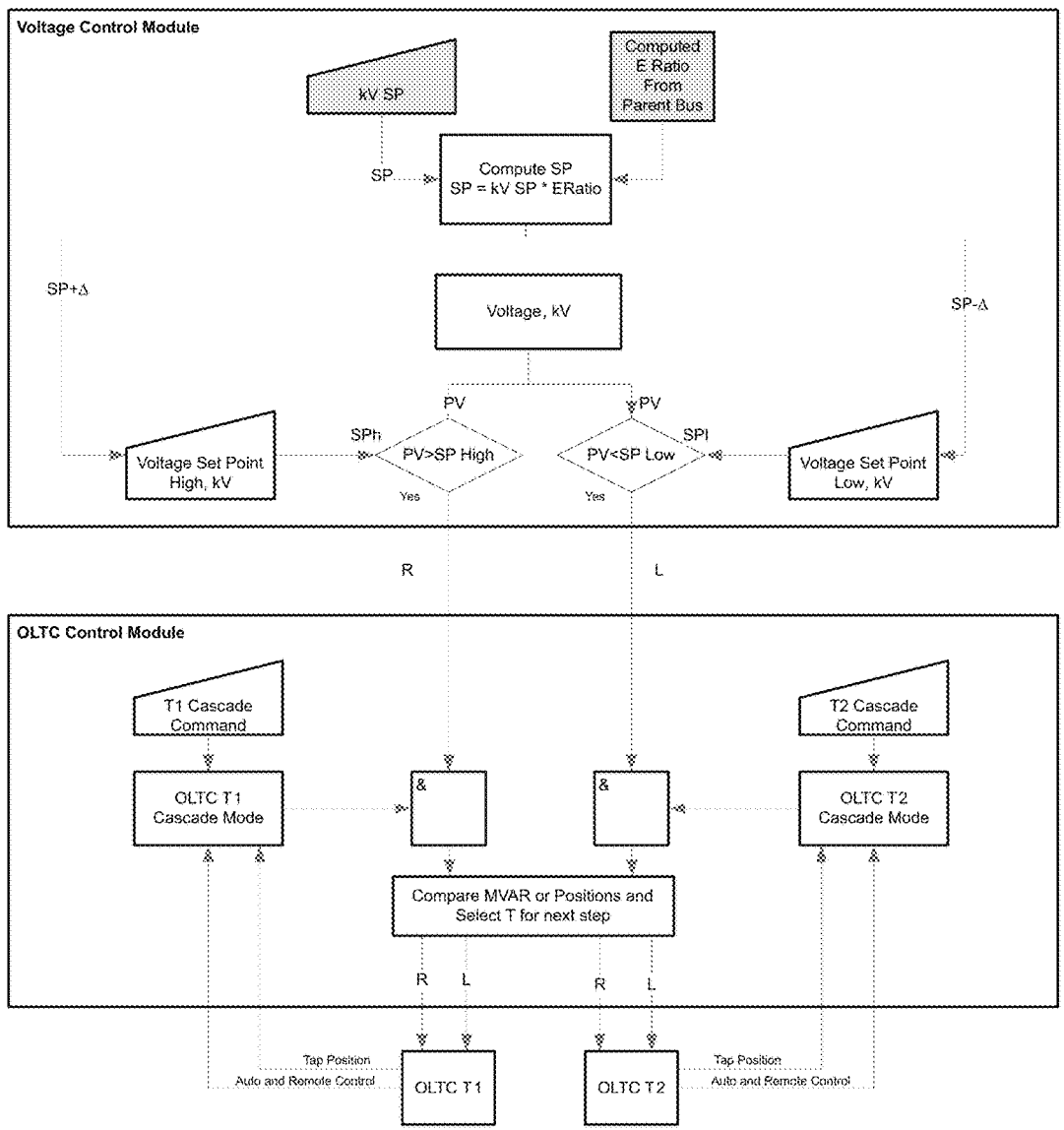
FIG. 8 shows control action of two transformers based on the bus voltage metering.

Next section of the disclosed invention relates to transformer control actions for the Low Level substations. FIG. 8 illustrates the control action of two transformers based on bus voltage metering. The algorithm consists of two major components—Voltage Control Module and OLTC Control Module. The Voltage Control Module utilizes transformer OLTC's as a method of "coarse" voltage adjustment. The algorithm proceeds with creating a set point SP which is calculated according to equation (16)

$$SP = kV\ SP \cdot R_e \qquad (16)$$

Where kV SP is operator adjustable and $R_e$ is the E Ratio calculated by the High Level Substation Module. This set point is split into High Voltage set point SPh and Low Voltage set point SPl using a dispatcher adjustable parameter δ according to equations (17) and (18).

$$SPh = SP + \delta \qquad (17)$$

$$SPh = SP - \delta \qquad (18)$$

This is done to ensure that the on load tap changers only change position whenever the demand value exceeds a set of predefined limits. The voltage control module provides the "Raise" R or "Lower" L commands to the OLTC control module based on conditions provided by equation (19).

$$OUT = \begin{cases} R \mid PV > SPh \\ L \mid PV < SPl \end{cases} \quad (19)$$

Transformers' OLTC's can operate independently from each other or their steps can be coordinated. For example, if OLTC T2 Cascade mode is OFF and OLTC T1 Cascade mode is ON, then only T1 will execute Voltage Control Module's "Raise" and "Lower" commands. In case of coordination, the disclosed invention provides a load sharing function which allows balancing of the reactive power output among such transformers.

Each transformer's reactive power range (Qmin and Qmax) is defined based on rated power and flowing active power according to equations (20) and (21).

$$Qi\_min = -\sqrt{MVA_i^2 - MW_i^2} \quad (20)$$

$$Qi\_max = \sqrt{MVA_i^2 - MW_i^2} \quad (21)$$

For i={1,2}. Similar to above, the load rate is computed according to equation (22).

$$PV_{lsiBT} = \frac{MVAR_i - MVAR_{i\,min}}{MVAR_{i\,max} - MVAR_{i\,min}} \quad (22)$$

Each OLTC's load sharing algorithm step then compares $PV_{lsiBT}$ with the average load rate (or Load Sharing Set Point) given by equation (23).

$$SP_{lsR0} = \frac{\sum_{i=1}^{2} PV_{lsiBT}}{2} \quad (23)$$

If each unit Load Sharing Process Variable is different from Load Sharing Set Point, a correction is carried out on each transformer according to equation (24).

$$OUT_{Tlsi} = \begin{cases} OUT_{Tlsi(n-1)} - \epsilon_i \mid PV_{lsiBT} > SP_{lsR0} \\ OUT_{Tlsi(n-1)} + \epsilon_i \mid PV_{lsiBT} < SP_{lsR0} \end{cases} \quad (24)$$

Where $OUT_{Tlsi}$ is the transformer's load sharing loop current scan output, $OUT_{Tlsi(n-1)}$ is the load sharing loop previous scan output and $\epsilon_i$ is a parametrically defined load sharing ramp.

Figure 9:
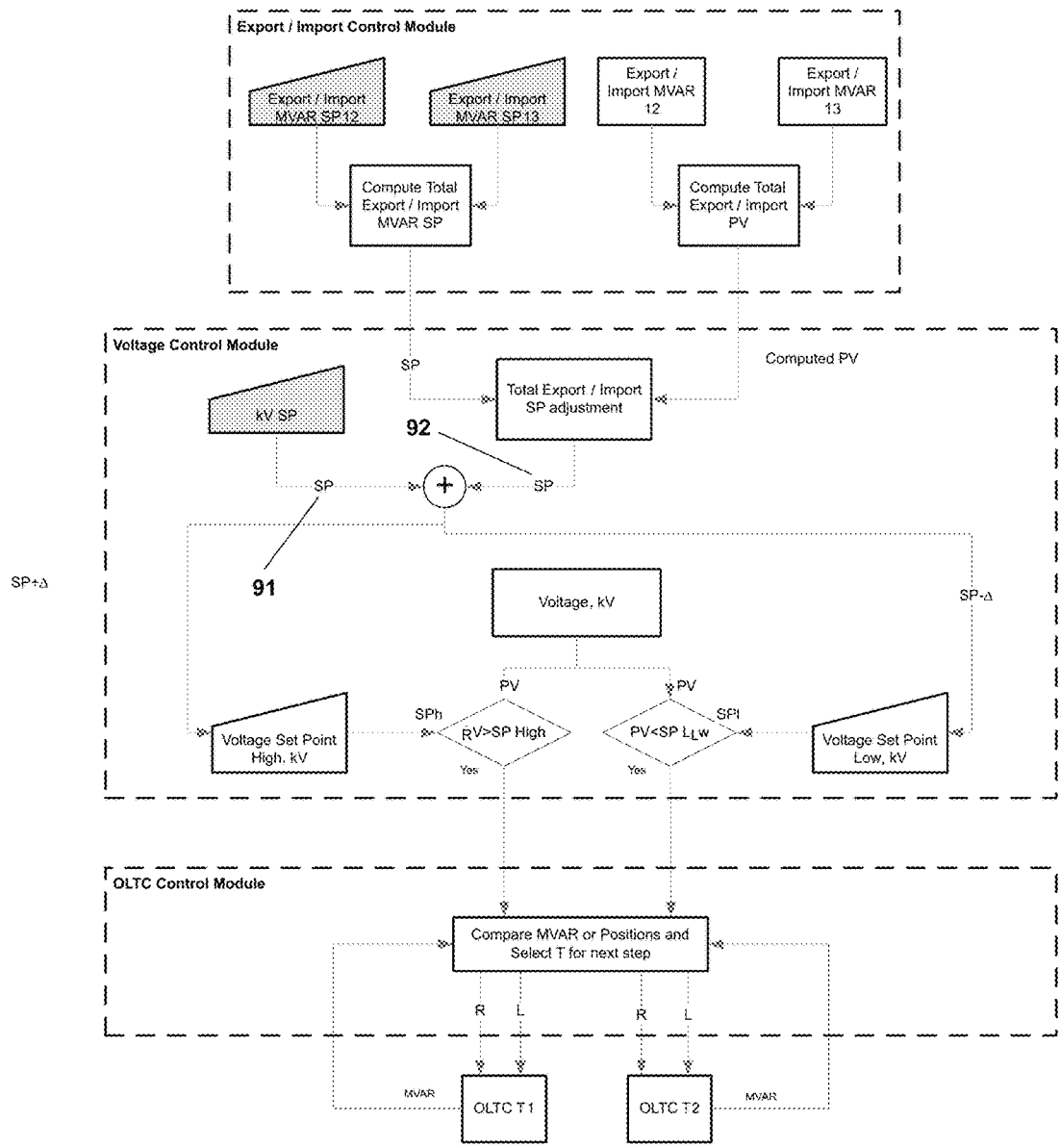
FIG. 9 shows High Level Voltage Control Module control action.

The final step of the disclosed invention is the High Level Voltage Control Module control action; its architecture is shown in FIG. 9. The main algorithm idea is similar to that of Low Level Voltage Control—it is a combination of voltage control module and OLTC control module. The key difference with High Level Voltage Control is the Export/Import Control module that regulates reactive power. The High Level Voltage Control Module control action is implemented by manipulating OLTC's of two transformers based on the bus voltage metering, where the on load tap changers of the transformers are used as a "coarse" voltage adjustment.

The High Level Voltage Control Module action consists of three major components. These are the Export/Import Control Module, which distributes the total load by equalizing appropriate variables, the Voltage Control Module which provides the High and Low level set points, and the OLTC Control Module which adjusts tap changer positions to generate appropriate MVAR values.

The primary control variable of Export/Import Control Module is the average MVAR of all export/import distribution lines. Referring now to the power system shown in FIG. 1, the two major MVAR set points are operator adjustable and are set by the export/import of reactive power between Substation 1 and Substation 2 as well as between Substation 1 and Substation 3. Let the former export/import MVAR set point be denoted by SP12 and let the latter export/import MVAR set point be denoted by SP13. The overall Export/Import Control Module set point is then given by equation (25).

$$MVAR\ SP = \frac{MVAR\ SP12 + MVAR\ SP13}{2} \quad (25)$$

Additionally, let MVAR 12 and MVAR 13 be the measured process variables for the exchange of reactive power between Substation 1 and Substation 2 and Substation 1 and Substation 3, respectively. Then the total export/import PV is given by equation (26).

$$MVAR\ PV = \frac{MVAR\ PV12 + MVAR\ PV13}{2} \quad (26)$$

Next step of the algorithm is the Voltage Control Module. The Set Point for control algorithm of High Level Voltage Control Module is the sum of the operator defined set point 91 and the Export/Import Control Module outputs 92; let this set point value be σ_SP. This set point is split into High Voltage set point H_SPh and Low Voltage set point H_SPl using a dispatcher adjustable parameter γ according to equations (27) and (28).

$$H\_SPh = \sigma\_SP + \gamma \quad (27)$$

$$H\_SPl = \sigma\_SP - \gamma \quad (28)$$

As before, this is made available by the disclosed invention to ensure that the on load tap changers only change position whenever the demand value exceeds a set of predefined limits. Similar to low level substation control, the voltage control module provides the "Raise" R or "Lower" L commands to the OLTC control module based on conditions provided by equation (29).

$$OUT = \begin{cases} R \mid PV > SPh \\ L \mid PV < SPl \end{cases} \quad (29)$$

Transformers' OLTC's can operate independently from each other or their steps can be coordinated. For example, if OLTC T2 Cascade mode is OFF and OLTC T1 Cascade mode is ON, then only T1 will execute Voltage Control Module's "Raise" and "Lower" commands. In case of coordination, as with the low voltage control, the disclosed invention provides a load sharing function which allows balancing of the reactive power output among such transformers.

Similar to low level voltage control, each high voltage transformer's reactive power range (HL_Qmin and HL_Q- max) is defined based on rated power and flowing active power according to equations (30) and (31).

$$HL\_Qi\_\min = -\sqrt{MVA_i^2 - MW_i^2} \qquad (30)$$

$$HL\_Qi\_\max = \sqrt{MVA_i^2 - MW_i^2} \qquad (31)$$

For i={1,2}. The load rate is similarly computed according to equation (32).

$$HL\_PV_{lsiBT} = \frac{HL\_MVAR_i - HL\_MVAR_{i\,min}}{HL\_MVAR_{i\,max} - HL\_MVAR_{i\,min}} \qquad (32)$$

Each OLTC's load sharing algorithm step then compares $HL\_PV_{lsiBT}$ with the average load rate (or Load Sharing Set Point) given by equation (33).

$$HL\_SP_{lsR0} = \frac{\sum_{i=1}^{2} HL\_PV_{lsiBT}}{2} \qquad (33)$$

If each unit Load Sharing Process Variable is different from Load Sharing Set Point, a correction is carried out on each transformer according to equation (34).

$$HL\_OUT_{Tlsi} = \begin{cases} HL\_OUT_{Tlsi(n-1)} - \theta_i \mid HL\_PV_{lsiBT} > HL\_SP_{lsR0} \\ HL\_OUT_{Tlsi(n-1)} + \theta_i \mid HL\_PV_{lsiBT} < HL\_SP_{lsR0} \end{cases} \qquad (34)$$

Where $HL\_OUT_{Tlsi}$ is the transformer's load sharing loop current scan output, $HL\_OUT\ T_{lsi(n-1)}$ is the load sharing loop previous scan output and $\theta_i$ is a parametrically defined load sharing ramp.

What is claimed:

1. A method for controlling, with a control element, voltage for an electric power system, the electric power system including at least a High Level Substation interconnected with a Low Level Substation, and for controlling, with the control element, at least one load using a plurality of Voltage Control Modules, wherein one of the Voltage Control Modules corresponds to the High Level Substation and another one of the Voltage Control Modules corresponds to the Low Level Substation, the method comprising:

assessing an operating mode of each Voltage Control Module corresponding to the High Level and Low Level Substations, wherein the High Level Substation has a highest voltage of the interconnected Substations connected to a power grid of the electric power system and the Low Level Substations has a lower voltage than the highest voltage and is connected to the High Level Substation via a plurality of first transformers, and wherein the Low Level Substation is connected to the at least one load through a plurality of step-down or step-up transformers;

controlling, with the control element, the voltage for the electric power system according to the assessing; and counteracting destabilizing interactions between the Voltage Control Modules corresponding to the High Level and Low Level Substations using a Set Point Correction Coefficient for a Low Level proportional-integral-derivative (PID) Voltage Controller, wherein the Set Point Correction Coefficient is calculated via the following steps:

computing a value for the Set Point Correction Coefficient as a ratio of a Primary Process Control Variable and a Primary Voltage Set Point; and sending said Set Point Correction Coefficient to the Voltage Control Module corresponding to the Low Level Substation.

2. The method of claim 1 further comprising:

performing a Primary Voltage Control function, wherein the Voltage Control Module corresponding to the High Level Substation calculates its PID response from a deviation of its voltage variable to manipulate set points of a plurality of Automatic Voltage Regulators (AVR) corresponding to a plurality of generators directly connected to at least the High Level Substation in a way that minimizes interaction between high-voltage buses of the electric power system.

3. The method of claim 2, further comprising:

sensing a voltage for the High Level Substation;

defining a Primary Process Control Variable for a PID algorithm of the Voltage Control Module corresponding to the High Level Substation by constructing a function to calculate an average high-level bus voltage;

using the PID algorithm to calculate an AVR main control output;

defining a Primary Process Control Variable for a High Level PID algorithm of an Export/Import Control Module;

defining a Set Point for the High Level PID) algorithm of the Export/Import Control Module;

using the PID algorithm of the Export/Import Control Module to calculate an AVR secondary control output; and defining set points for turbo generators connected to the High Level Substation by adding the main and secondary control output.

4. The method of claim 1, further comprising:

controlling the Low Level Voltage Substation via a voltage control function, wherein the voltage control function allows the Voltage Control Module corresponding to the Low Level Substation to manipulate the set points of a plurality of Automatic Voltage Regulators corresponding to a plurality of generators directly connected to the Low Level Substation.

5. The method of claim 4, further comprising:

sensing a voltage for the Low Level Substation to be used as a Defining Primary Process Control Variable for a PID algorithm of the Voltage Control Module corresponding to the Low Voltage Substation;

defining a Set Point for the PID algorithm, wherein the value of the Set Point is computed as an operator-defined set point multiplied by a Set Point Correction Coefficient computed by the High Level Substation; and using the PID algorithm to calculate an AVR main control output.

6. The method of claim 1, further comprising:

sensing a reactive power flow rate of each of a plurality of generators connected to at least the High Level and Low Level Substations;

calculating a value of a flow rate balancing parameter using a scaling factor, wherein said scaling factor is calculated as a ratio of (a power flow rate current—a power flow rate minimal limit) and (a power flow rate maximal limit—the power flow rate minimal limit);

calculating a value of a Load Sharing Set Point as an average of balancing parameters across all of the plurality of generators; and manipulating a performance of each generator to match said flow rate balancing parameter to said Load Sharing Set Point.

7. The method of claim 1, further comprising:

employing a Reactive Power Limiting Control function which allows the electric power system to calculate course adjustments of an on load tap changer (OLTC) to limit an exchange of reactive power with the power grid within an operator-specified dead band;

sensing a reactive power flow rate of each of the plurality of first transformer;

defining a reactive power flow Set Point within a predefined range; and defining an OLTC position for each of the plurality of first transformers when the reactive power flow rate exceeds a predefined reactive power flow Set Point.

8. The method of claim 1, wherein each of the Voltage Control Modules corresponding to the High and Low Level Substations calculates its response from a deviation of its voltage variable to manipulate set points of online tap changers (OLTC) of the plurality of first transformers or the plurality of step-down or step-up transformers in a way that minimizes interaction between high-voltage buses of the electric power system.

9. The method of claim 8, further comprising:

sensing a voltage and a reactive power flow rate for each of the plurality of first transformers that connect the High Level Substation, the Low Level Substation, and the load;

defining a Process Control Variable for a High Level computation algorithm of an Export/Import Control Module;

defining a Set Point for the High Level computation algorithm of the Export/Import Control Module;

using the High Level computation algorithm of the Export/Import Control Module to calculate an OLTC secondary control output;

defining Voltage Control Module Set Points by summing an operator-adjustable set point and the OLTC secondary control output;

adding a Set Point Correction Coefficient computed by the High Level Substation Module to the defined Voltage Control Module Set Points; and defining an OLTC position for the plurality of first transformers when the voltage exceeds the defined Voltage Control Module Set Points.

10. The method of claim 9, further comprising:

sensing a reactive power flow rate of each of the plurality of first transformers;

comparing the reactive power flow rates; and when a primary control variable exceeds the defined Voltage Control Module Set Points, load sharing algorithm generates an OLTC control step for only one transformer of the plurality of first transformers, whereby performing the control step produces a smaller difference between the reactive power flow rates.

* * * * *